3,758,338
POSITIVE ELECTRODE FOR A LITHIUM-CHARGE STORAGE ELECTROCHEMICAL CELL
Sidney M. Selis, deceased, late of Oak Park, Mich., by Betty Selis, executrix, Oak Park, Mich., assignor to General Motors Corporation, Detroit, Mich.
Filed Apr. 277, 1972, Ser. No. 247,947
Int. Cl. H01m 35/02
U.S. Cl. 136—6 F     2 Claims

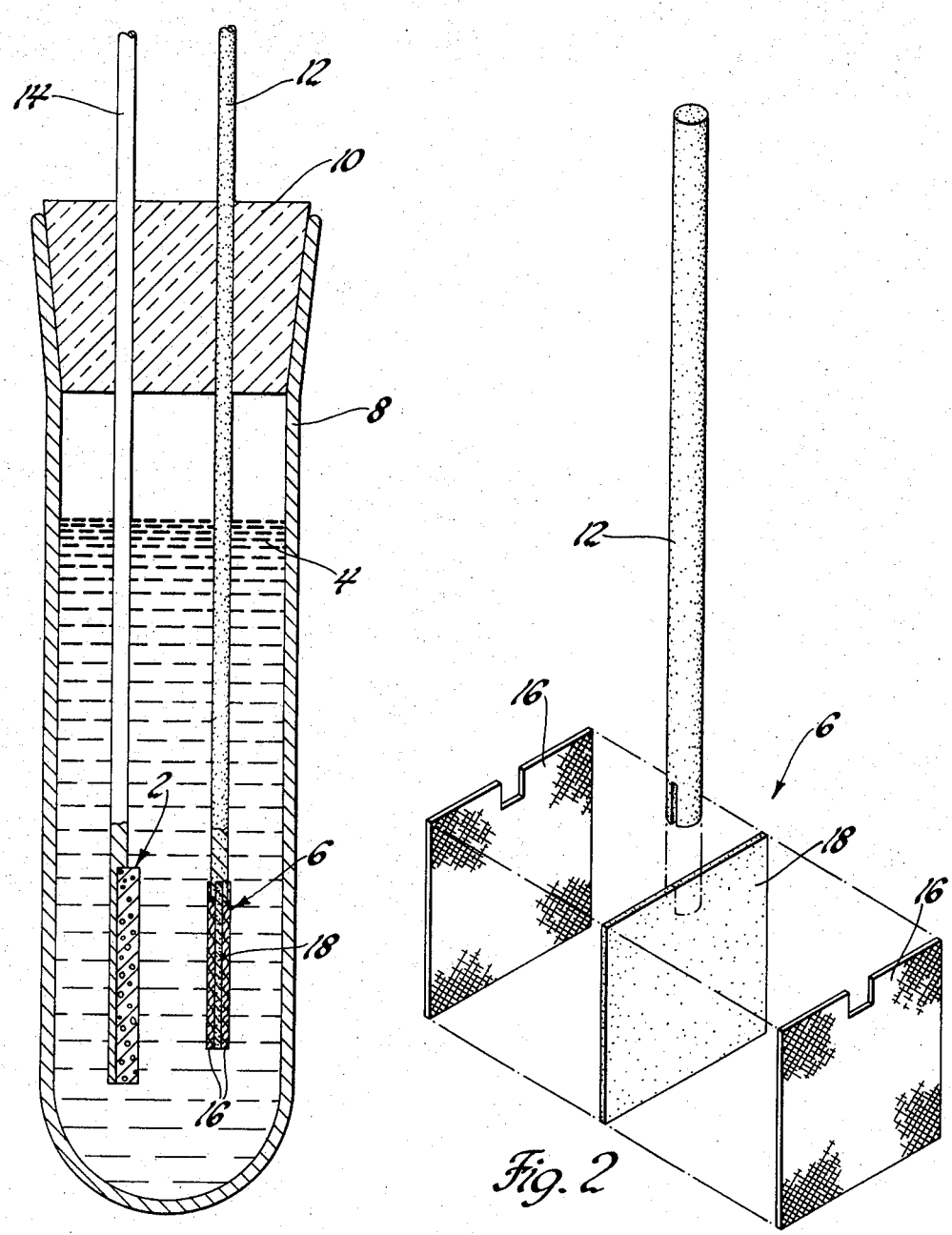
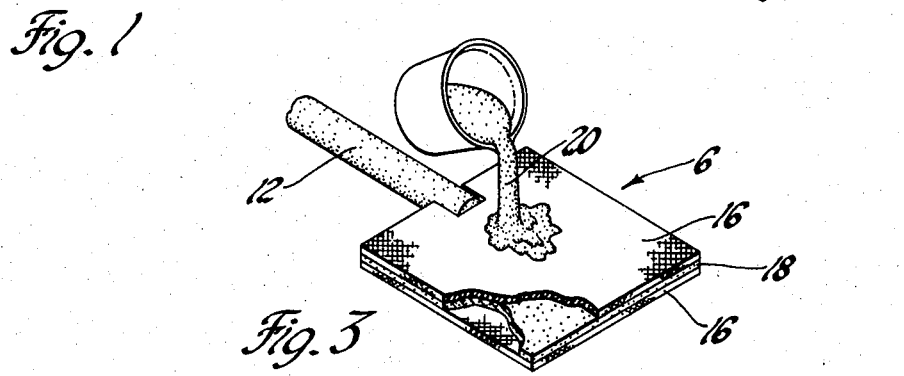

ABSTRACT OF THE DISCLOSURE

A thin, positive electrode for a lithium-charge storage electrochemical cell and a method for its manufacture. A thin layer of conductive carbonized fabric is bonded to the surface of a graphite sheet and then impregnated with an aqueous, polyvinylidene chloride emulsion followed by the in situ pyrolysis of the polyvinylidene in the interstices of the fabric to produce a high surface area electrode having a thin active layer and low electronic resistance.

BACKGROUND OF THE INVENTION

Molten salt, lithium-charge storage batteries have been described in the literature—e.g. Fast Charge Molten Salt Batteries, Rightmire and Jones, Proceedings of the 21st Annual Power Sources Conference (1967). Such batteries (see FIG. 1) have lithium-rich negative electrodes 2, lithium chloride-rich electrolytes 4, high surface area porous carbon positive electrodes 6 and, where required, porous inert separators (not shown) between the negative 2 and positive 6 electrodes. Aluminum-lithium alloys containing 70% to 95% aluminum are said to make satisfactory solid negative electrodes whereas liquid negative electrodes can be made by holding pure lithium metal by capillary action within the interstices of porous metal matrices such as is illustrated in FIG. 1 and disclosed in Craig 3,560,265 issued Feb. 2, 1971. Other porous metal matrices may also be used effectively. The electrolyte 4 contains lithium chloride, either pure or in admixture with other alkali metal halides having higher disassociation potentials than lithium chloride. It is considered desirable to operate these cells in the range of 360° C. to 600° C. with the lower temperatures being preferred. The potassium, cesium and rubidium chlorides mix well with LiCl and are effective in lowering the melting point of the electrolyte to the preferred lower temperature. The most preferred electrolyte is the eutectic or a near eutectic mixture of LiCl and KCl. The eutectic LiCl-KCl mixture contains about 60 mole percent LiCl and 40 mole percent KCl and melts near 352° C. Porous separators or spacers are desirable especially when close electrode spacing is employed. Such spacers comprise inert materials such as porous ceramics having porosity profiles which maximize flow through the separator. A preferred spacer material is a fibrous or felted mat of boron nitride. Mechanism-wise, as the cell is charged and the potential of the carbon electrode becomes increasingly positive, there is an apparent structuring of the ion layers at the electrode-electrolyte interface with a restructuring when the electrode is discharged. The molten salt electrolyte permeates the microporous structure of the high surface area carbon in the positive electrode and, in so doing, comes into intimate contact with a high percentage of the carbon atoms therein. The net result is a composite of an ionically conducting medium (i.e. the electrolyte) and an electronically conducting medium (i.e. the carbon). The electrochemical reaction occurs at the interface of the two media and the charge is apparently stored at the surface of the carbon. The cell is housed in an appropriate container 8 having a closure 10 and appropriate conductive leads 12 and 14 for the positive and negative electrodes respectively.

Heretofore, positive charge-storage electrodes have been made by molding pyrolyzed Saran (i.e. polyvinylidene chloride polymers and copolymers) into thick blocks and affixing current collectors to the backsides of the blocks. Charge-storage blocks of this type have ranged from 0.125 inch to 0.6 inch thick. The IR drop through the block of pyrolyzed Saran is substantial. Though it has been recognized that thinner blocks would reduce this drop, it has been considered undesirable to make the blocks too thin lest there be a corresponding loss in charge storage capacity.

THE INVENTION

Evidence now indicates that only a very thin layer of the positive electrode near the electrolyte is responsible for most of the storage capacity of the electrode and that any additional thickness beyond that layer only increases the electrode's resistance without contributing any substantial increased capacity to it. It then is an object of this invention to capitalize on this now appreciated phenomenon and to produce a charge-storage positive electrode which has not only a very thin active or storage layer but also a highly electronically conductive matrix holding the active layer so that as a whole the electrode has a low IR drop without any appreciable capacity loss. This invention is described hereafter in conjunction with the appended drawings in which:

FIG. 1 is a sectioned schematic of a Li-charge storage cell (without an interelectrode spacer);

FIG. 2 is an exploded perspective view illustrating assembly of a positive electrode according to this invention; and FIG. 3 is a perspective view illustrating impregnation of the electrode according to this invention.

In the positive electrode of the present invention, the charge storing layer is very thin and comprises polyvinylidene chloride char dispersed throughout the interstices of a macroporous conductive matrix which forms part of the electrode's current collector. For the most effective operation, the porous conductive matrix should cover the entire surface of the current collector. In a preferred embodiment, the matrix portion of the negative electrode 6 comprises woven carbon cloth 16 conductively bonded to a thin sheet of graphite 18. A carbon or graphite cloth 16 particularly useful for this purpose is plain woven with 2-ply yarn in both the warp and fill portions of the weave. The yarn filaments are 0.0003 inch and the woven cloth has a thickness of about 0.017 inch. It has 27 yarns/inch warp and 23 yarns/inch fill. A one inch wide strip of such a carbon cloth has an electrical resistance of 0.54 ohms/inch while a similar strip of graphite cloth has an electrical resistance of 0.49 ohm/inch. Carbon or graphite felts or mats may also be used in place of the fabric. This matrix layer of the current collector, and hence the active or charge storing layer, is akin to a skin on the current collector and need not exceed about 0.02 inch for effective electrode performance. The graphite sheet 18 may be virtually any thickness consistent with the strength, current carrying capacity, and space requirements of the cell in which it is to be used. Even extremely thin graphite sheets are useful here. One such thin material is a product marketed by Union Carbide Corporation under the name "Grafoil" which has a very low permeability, is available in thicknesses ranging from 0.005 inch to 0.015 inch and has a specific resistivity of about $8 \times 10^{-4}$ ohm-cm. Several layers of this material can be used to build up any desired thickness.

The porous matrix or cloth 16 is bonded to the graphite sheet 18 by means of any good conductive carbon cement which is insert to the cell's operating environment. Acceptable cements for this purpose are National Carbon Corporation's C-9 or C-34 cements. These cements are a paste comprising 100 parts of a black powder and about 30 parts liquid vehicle and are applied and cured according to the manufacturer's instructions. Subsequent heating of the bonded composite to above 932° C., and preferably 1000° C. for about 6 hours insures conversion of the cement's materials completely to carbon and renders it chemically inactive in the cell environment.

As depicted in FIG. 3, the porous matrix portion 16 of the current collector is impregnated with the charge-storing carbons forming the active layer of the electrode. One way of accomplishing this is by simply packing Saran particles into the interstices of the matrix and then pyrolyzing the Saran in the known manner. One Saran useful for this purpose is identified by its manufacturer, Dow Chemical Company, as F-300 which is a copolymer of vinylidene chloride and acrylonitrile. In a preferred embodiment, the porous matrix 16 is saturated with an aqueous Saran emulsion 20 containing about 25% foamed Saran microspheres in water. Such an emulsion is identified by its manufacturer, Dow Chemical Company, as CX-4519.1. In the dry state, the bulk density of the microspheres is less than 1.0 lb./cu. ft. and their true density about 2.0 lbs./cu. ft.

Repeated treatments with the emuslion may be necessary to insure sufficient build-up of Saran particles in the matrix. In this regard, a 5 cm. x 7 cm. swatch of carbon fabric, as above and after cementing, holds about 0.18 gram of Saran char based on weighings made before impregnation and after pyrolysis.

Following impregnation of the matrix and, in the manner described by Reed and Schwemer, J. Electrochem. Soc. 114, 582 (1967), the electrode is heated in a vacuum (ca. 30 inch Hg). The temperature is gradually increased at a rate of about 10° C. per hour to a temperature of 165° C. to 175° C. and held there for about 16 hours to pyrolyze the Saran. This is followed by firing the electrode at about 1000° C. for a time sufficient to complete the pyrolysis reaction. The 1000° C. firing may be done in a vacuum, but it is preferably carried out in an inert atmosphere such as argon. The pyrolysis products thusly formed within the interstices of the electrically conductive matrix have large surface areas (i.e. as much as 2000 m.$^2$/g.) as determined by the Brunaver-Emmett-Teller (BET) method.

While this invention has been described in terms of specific embodiments thereof there is no intention to be limited thereto except to the extent hereinafter set forth in the claims which follow.

I claim:
1. In a method of fabricating a molten salt secondary cell of the charge-storage type having a lithium-rich negative electrode, a fused lithium chloride-rich electrolyte, and a high surface area carbon positive electrode, the improvement comprising said positive electrode being formed by:
   conductively bonding a layer of carbonized fabric having a thickness of less than about 0.02 inch to the surface of a carbonaceous substrate to form an integral composite of the two materials;
   impregnating said layer with an aqueous emulsion of a resin selected from the group consisting of polyvinylidene cholride polymers and copolymers;
   pyrolyzing said resin in a vacuum by gradually heating the resin to a temperature of about 165° C. to 175° C.;
   maintaining said temperature and vacuum for about 16 hours to substantially complete the pyrolysis reaction; and
   firing said composite in an inert atmosphere at about 1000° C. for sufficient time to complete the pyrolysis reaction and insure that the balance of the electrode is substantially inert to said cell's environment.

2. A molten-salt secondary charge-storage cell comprising a lithium-rich negative electrode, a fused, lithium chloride-rich electrolyte, and a positive electrode comprising a thin carbonaceous current collector, a macro-porous carbonaceous skin on the surface of said current collector said skin having a thickness of less than about 0.02 inch forming a conductive matrix for the electrode's active layer, and a high surface area polyvinylidene chloride char substantially filling the interstices of said macro-porous skin and forming a charge-storing bed of char within said matrix.

References Cited
UNITED STATES PATENTS

| | | | |
|---|---|---|---|
| 3,462,312 | 8/1969 | Rightmire et al. | 136—100 R |
| 3,485,674 | 12/1969 | Sprague et al. | 136—83 R |
| 3,560,265 | 2/1971 | Craig | 136—86 D |

ANTHONY SKAPARS, Primary Examiner

U.S. Cl. X.R.

136—83 R, 100 R